June 20, 1961
S. G. JOHNSON
2,988,817
PIVOTALLY CONTRACTIBLE PLUG GAGE FOR
TESTING DIAMETER AND CENTRICITY
Filed March 17, 1958
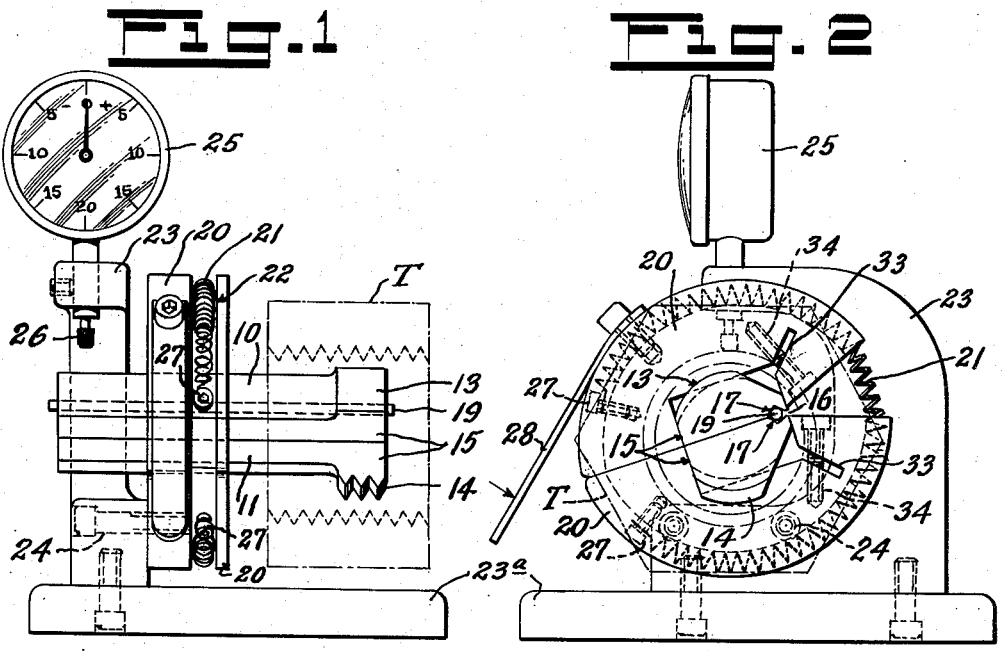
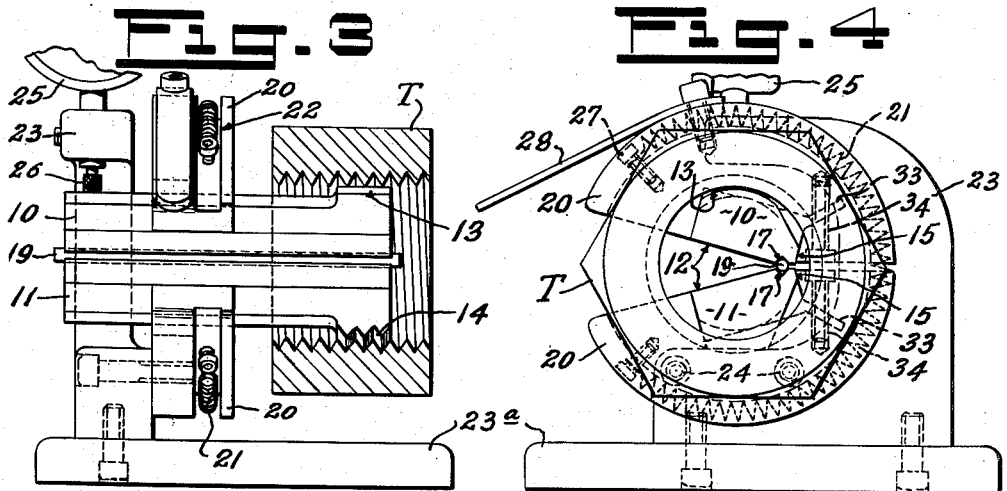
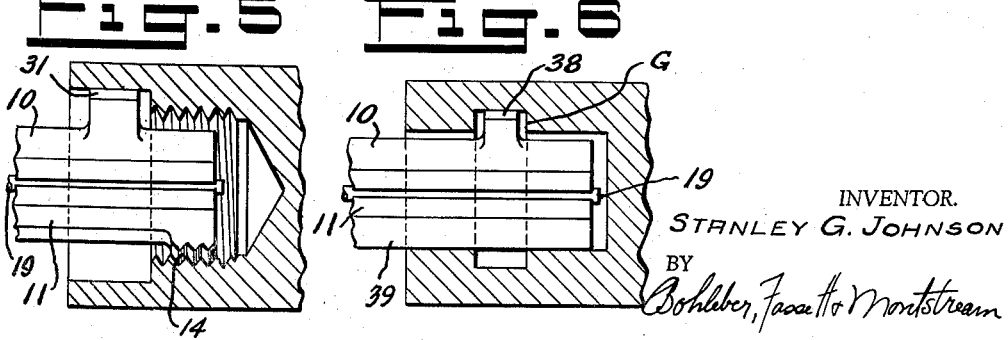
INVENTOR.
STANLEY G. JOHNSON
BY
Bohleber, Jacox & Montstream
ATTORNEYS

United States Patent Office 2,988,817
Patented June 20, 1961

2,988,817
PIVOTALLY CONTRACTIBLE PLUG GAGE FOR TESTING DIAMETER AND CENTRICITY
Stanley G. Johnson, West Hartford, Conn., assignor to The Johnson Gage Development Company, Bloomfield, Conn., a corporation of Connecticut
Filed Mar. 17, 1958, Ser. No. 721,772
5 Claims. (Cl. 33—199)

The invention relates to an adaptation of the plug or internal gage of the contractible and expansible type shown in Patent 2,706,859, dated April 26, 1955, and is constructed for gaging the relative dimensions and centricity of internal plain cylindrical surfaces, grooves, screw threads and combinations thereof. The gage includes two gaging members each having a gaging surface, the cross section of which is less than a semicircle, and mounted for pivotal movement about a longitudinal axis which lies within the gaging surfaces and adjacent the periphery thereof. Either both gaging members pivot or one pivots with respect to the other. The gage is inexpensive to manufacture, readily portable, and is effective in gaging relative internal diameters, their centricity and their relative taper if any.

It is an object of the invention to construct a new and novel plug or internal gage of the type referred to which will gage the relative diameters of two different internal surfaces, their relative centricity, and their relative taper if any.

Another object of the invention is to construct a plug or internal gage of the type referred to which will test the relative centricity of an internal thread and its minor diameter, their relative diameters, and any relative taper.

A still further object is to construct a plug or internal gage of the type referred to which will test the relative diameter and centricity of two axially spaced internal surfaces.

Another object is to construct a gage of the type referred to which will test the relative diameter of and centricity of a groove within a hole the surface of which may be threaded or plain.

Other objects of the invention will be more apparent from the following description when taken in connection with the accompanying drawings illustrating a preferred embodiment thereof in which:

FIG. 1 is a front elevation of the gage contracted for insertion within the hole of a test part;

FIG. 2 is an end view of the gage of FIG. 1;

FIG. 3 is an enlarged view of the gage expanded to test the centricity of a thread with its minor diameter;

FIG. 4 is an end view of FIG. 3;

FIG. 5 is a partial view showing the gaging members in axial spaced relation and expanded in the hole of a test part for testing the centricity of a thread with an adjacent surface; and FIG. 6 is a partial view of the gaging members expanded in an internal hole having a groove for testing the relative diameter and centricity of the bottom surface of the groove with respect to the surface of the hole.

The gage includes a pair of cooperating gaging members 10 and 11, the outer surface of at least one of which is arcuate and the outer surface of each member forms the gaging surface. The gaging surface 13 may be such as to engage a thread at its minor diameter and hence is plain surfaced, that is, unthreaded and may be either cylindrical or tapered and may be arcuate or a narrow or sharp edge. The other gaging surface 14 on the other gaging member is shown as having helical ridges corresponding with the internal thread of the test hole and arcuate. Arcuate gaging surfaces are less than semicylindrical or less than semicircular in cross section and have chordal surfaces 12. The thread ridges may be full formed as shown or may be formed to engage at the pitch diameter.

Pivot means pivotally supports or mounts at least one of the gaging members relatively to the other, that shown in the figures including a groove 17 extending longitudinally in the chordal surface 12 of at least one gaging member although preferably a groove is provided in each gaging member. The grooves may be milled or otherwise formed in the surface. The pivot means or grooves are parallel with the axis of the gaging surface. The groove particularly illustrated is a V groove although it may be any desirable shape and preferably is as close as possible to the gaging surface and for a screw thread gage its most desired location is with its edge closely adjacent to the minimum or root circle of the screw thread. Each edge 15 of each gaging surface having a screw threaded gaging surface is cut away such as to the roots of the screw thread in parallel planes for added clearance in removing the gage from a test threaded hole and if desired to provide gripping surfaces. A desirable way to make a gaging member with a screw threaded gaging surface and with plain surfaces is described in the aforesaid patent.

The pivot means for the gaging members may take several forms which are described in the earlier patent. The means shown includes the grooves 17 forming bearings and a pivot such as a pin 19 which may be desirably about $\frac{1}{10}$ the diameter of the gage. The grooves 17 are dimensioned to support the pivot or pin so that the gaging members may pivot thereon. There is a considerable range of diameters of pins which may be used for this pivot; however, greater pivoting movement is secured when the pin is small relatively to the diameter of the gage members. The pivot is a simple straight pin or wire. A part of the back edge 16 of the gage members may also be removed to provide pivoting clearance at this back edge; however, it should not be high enough to remove the line of contact of this side of the groove with the pivot pin. The grooves are adjacent to the gaging surface or spaced from the center of the chordal surface of the gaging members. With the grooves in the gaging members the latter provide their own bearing for the pivot means and the bearing has a length coextensive with the gaging members. Each gaging member supports and gives rigidity to the other thereby eliminating or minimizing bending of the gaging members particularly for small gages.

It will be observed that it is the spring pressure of the spring 21 which holds the two gaging members 10 and 11 pivotally together on the pivot 19. This pivot is shown as a free pin in that it can slide axially in the grooves 17. The gaging members have free axial movement with respect to each other sliding longitudinally on the pivot pin.

Each gage member is secured to a holder 20 in any suitable manner so that the gaging members 10 and 11 project therefrom. Means are provided to press the gaging members onto the pivot and to hold the gage in assembled relation, the means particularly illustrated being a spring means shown as a coil spring 21 received in a groove 22 in each holder and one end secured to each holder by a screw 27. This spring pivots the gaging members to open or expanded position. The holders 20 and the spring 21 constitute means for opening and closing the gaging members. The spring also has the additional function in a construction using grooves 17 or half bearings of holding the gaging members together.

The gage may be a hand gage if desired. It also may be mounted to form a bench gage in which case one of the gage member holders may be secured to a frame 23 such as by a bolt or screw 24 and having a base 23a. An indicator shown as a dial indicator 25 is also carried by the frame and the contact pin 26 thereof engages a movable upper part of the gage and shown particularly as the gage member 10. One of the holders may have a handle 28 secured thereto for greater ease in contracting the gage. When used as a portable gage the gage is removed from the frame and mounted on a similar frame of lighter construction which portable frame, however, lacks the base 23a or the base may be removed from the frame shown.

The gage is used by pressing the two gaging members together which closes the same with the chordal surfaces in contact or substantial contact whereupon the internal thread of the test part T to be gaged is slipped over the end of the gaging members or the gage is inserted in the test hole. Upon releasing of the handle, the spring 21 opens the gaging members so that the threaded gaging surface 14 contacts the internal thread and the plain gaging surface 13 engages the thread at its minor diameter. The indicator thereupon indicates whether or not the relative internal dimensions are within the allowed tolerances and the test part is acceptable. If now the test part or the gage is rotated any variation in the indicator reading shows relative eccentricity between the thread and the minor diameter. With relatively short gaging surfaces, as shown by testing each end of the test part, any taper of the minor diameter with respect to the thread will be revealed. The gage is then closed and the test part removed.

The gaging members 10 and 11 may be secured to the holders 20 in any suitable fashion. The securing means shown includes a recess in each holder and a slit 33 to provide flexibility. A screw 34 then clamps the gaging member in the recess of its holder against the flat faces 15 of the gaging member.

The gage may be constructed to test the relative dimensions of a thread and a surface adjacent to the thread as illustrated in FIGURE 5. Here the gaging member 11 as described above is used. The other gaging member 10 has a gaging surface 31 which is spaced axially from the gaging surface 14 so as to engage an adjacent cylindrical surface such as the wall of a counterbore. Rotation of the gage will reveal that the wall or surface of the counterbore is concentric with the thread if there is no change in the reading of the indicator. If the indicator reading changes, relative eccentricity is revealed.

FIGURE 6 shows a gage for testing the relative centricity of a groove G and a plain surfaced hole. In this gage the gaging member 10 has a gaging surface 38 which engages the bottom surface of the groove and gaging member 11 has a gaging surface 39 for engaging the surface of the hole. Rotation of the test part or the gage members will reveal the centricity of one surface with respect to the other. Other combinations of gaging surfaces will be apparent.

This invention is presented to fill a need for improvements in a pivotally contractible plug gage for testing diameter and centricity. It is understood that various modifications in structure, as well as changes in mode of operation, assembly, and manner of use, may and often do occur to those skilled in the art, especially after benefiting from the teachings of an invention. This disclosure illustrates the preferred means of embodying the invention in useful form.

What is claimed is:

1. A pivotally contractible plug gage comprising a single pair of cooperating gaging members, each gaging member having an external gaging surface and a chordal surface, at least one of the gaging surfaces being arcuate with an axis at the center of the gaging surface, the gaging surfaces of the gaging members being of different dimensions from their chordal surfaces, each gaging member being less than a semicircle in cross section, pivot means carried by the gaging members to pivotally mount the gaging members and having its axis extending parallel to said axis of the gaging surface, the pivot means axis being within boundaries formed by the gaging surfaces and located adjacent to the gaging surfaces, means to expand and contract the gaging members, and an indicator to indicate the relative expanded position of the gaging surfaces.

2. A pivotally contractible plug gage as in claim 1 in which the gaging surface of one member is spaced in an axial direction from the gaging surface of the other member.

3. A pivotally contractible plug gage as in claim 1 for testing the relative dimension, taper and centricity of the minor diameter of a test thread with the thread, in which an arcuate gaging surface is of helical thread ridges corresponding with the thread to be tested, and the other gaging surface is plain and has a radial dimension for engaging said thread at its minor diameter.

4. A pivotally contractible plug gage as in claim 1 for testing the centricity of an internal groove with respect to a hole, in which one of the gage surfaces is relatively long, and the gaging surface of the other gaging member is narrower than the groove the surface of which is to be tested and located oppositely from the first gaging surface.

5. A pivotally contractible plug gage as in claim 1 for testing the relative dimension and centricity of a screw thread and an adjacent surface, in which one gaging surface has helical ridges corresponding to the internal thread to be engaged thereby, and the gaging surface of the other gaging member is smooth and spaced axially from the first gaging surface.

References Cited in the file of this patent

UNITED STATES PATENTS

| | | |
|---|---|---|
| 2,370,503 | Straw | Feb. 27, 1945 |
| 2,444,702 | Johnson | July 6, 1948 |
| 2,706,859 | Johnson | Apr. 26, 1955 |
| 2,842,861 | Johnson | July 15, 1958 |
| 2,849,797 | Etchell | Sept. 2, 1958 |